(12) United States Patent
Yamazaki et al.

(10) Patent No.: US 7,684,683 B2
(45) Date of Patent: Mar. 23, 2010

(54) WELDING APPARATUS AND WELDING METHOD

(75) Inventors: Kazuhiro Yamazaki, Shizuoka (JP); Haruo Otani, Shizuoka (JP); Fujihiko Sugiyama, Shizuoka (JP); Michihiko Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 732 days.

(21) Appl. No.: 11/297,194

(22) Filed: Dec. 8, 2005

(65) Prior Publication Data

US 2006/0127069 A1 Jun. 15, 2006

(30) Foreign Application Priority Data

Dec. 9, 2004 (JP) ............................. 2004-356621
Sep. 21, 2005 (JP) ............................. 2005-273433

(51) Int. Cl.
*F21V 7/00* (2006.01)
*G02B 17/00* (2006.01)
*B29D 11/00* (2006.01)

(52) U.S. Cl. ...................... 392/419; 392/420; 392/421; 156/272.2; 156/272.6; 156/273.3; 156/379.8; 264/1.9; 264/492

(58) Field of Classification Search ......... 392/419–422, 392/426, 428; 156/272.2, 272.6, 273.3, 275.4, 156/379.8; 264/1.9, 492, 493, 248, 249; 219/411, 553

See application file for complete search history.

(56) References Cited

U.S. PATENT DOCUMENTS

| | | | |
|---|---|---|---|
| 1,686,865 A * | 10/1928 | Klotz | .......................... 392/423 |
| 4,636,609 A | 1/1987 | Nakamata | |
| 5,840,147 A | 11/1998 | Grimm | |
| 6,054,072 A | 4/2000 | Bentley et al. | |
| 2003/0194226 A1* | 10/2003 | Miller et al. | ................. 392/421 |
| 2005/0087290 A1* | 4/2005 | Herold et al. | ............. 156/272.2 |

* cited by examiner

*Primary Examiner*—Stephen J Ralis
(74) *Attorney, Agent, or Firm*—Osha • Liang LLP

(57) ABSTRACT

A welding apparatus is provided with a lamp unit having a light source such as a halogen lamp and a multiple reflection surface. The light source applies incoherent electromagnetic waves that belong to a visible region and a near-infrared region in which a wavelength is 500 nm (nanometer) or more. The multiple reflection surface reflects and collects the light from the light source in the shape of a desired dot or line. The housing and the transparent cover are superimposed, and the light from the light source is collected by the multiple-reflection surface on the portion where the housing is superimposed on the transparent cover.

9 Claims, 4 Drawing Sheets

WELDING APPARATUS AND WELDING METHOD

The present application claims foreign priority based on Japanese Patent Application Nos. P.2004-356621 (filed on Dec. 9, 2004) and P.2005-273433 (filed on Sep. 21, 2005), the contents of which are incorporated herein by reference.

BACKGROUND OF THE INVENTION

1. Field of the Invention

The present invention relates to a welding apparatus and a welding method. Specifically, the present invention relates to a welding apparatus and a welding method of welding a housing of a vehicle lamp and a transparent cover, in which the apparatus is structured at a low cost and a welding work can be performed in a short time.

2. Related Art

There is a method of joining a housing of a vehicle lamp and a transparent cover by welding, by applying laser beams through the transparent cover to the housing so as to weld the housing and the transparent cover.

However, in a scan type in which a laser gun is moved along a welding line by use of a robot thereby to perform welding, a machining time becomes long, so that there is a problem that efficiency is bad.

Further, in a so-called flash type in which many laser guns are arranged over a full length of the welding line and perform welding simultaneously in order to shorten the machining time and increase the efficiency, the machining time can be reduced. However, the immense cost of equipment is required, which causes a problem of the increase of the vehicle lamp cost.

SUMMARY OF THE INVENTION

One or more embodiments of the present invention provide a welding apparatus and a welding method, in which the apparatus is structured at a low cost and a welding work can be performed in a short time.

In accordance with one or more embodiments of the present invention, a welding apparatus for welding one part to the other part, is provided with: a lamp unit including a light source and a multiple-reflection surface, wherein the light source applies incoherent electromagnetic waves, and the multiple-reflection surface reflects and collects the light of the light source in a shape of a dot or a line. In the apparatus, the light of the light source is collected by the multiple-reflection surface on a portion where the one part is superimposed on the other part.

Further, in accordance with one or more embodiments of the present invention, the one part may be a transparent cover of a vehicle headlamp and the other part may be a housing of the vehicle headlamp.

Further, in accordance with one or more embodiments of the present invention, the incoherent electromagnetic waves may belong to a visible region or a near-infrared region in which a wavelength is 500 nm (nanometer) or more.

Further, in accordance with one or more embodiments of the present invention, the light source may be a halogen lamp.

Further, in accordance with one or more embodiments of the present invention, the multiple-reflection surface may formed with a cross section formed in a collecting reflection surface in one direction, and another cross section formed in multiple paraboloidal surfaces in a direction orthogonal to the one direction.

Further, in accordance with one or more embodiments of the present invention, the collecting reflection surface may be an ellipsoidal reflection surface.

Further, in accordance with one or more embodiments of the present invention, a plurality of lamp units may be arranged along a portion where the one part and the other part are continuously superimposed.

In addition, in accordance with one or more embodiments of the present invention, a welding apparatus for welding a transparent cover of a vehicle headlamp to a housing of the vehicle headlamp, is provided with: a lamp unit including a light source and a multiple-reflection surface, wherein the light source applies incoherent electromagnetic waves, and the multiple-reflection surface reflects and collects the light of the light source in a shape of a dot or a line. In the apparatus, the light of the light source is collected by the multiple-reflection surface on a portion where the transparent cover is superimposed on the housing. The incoherent electromagnetic waves belongs to a visible region or a near-infrared region in which a wavelength is 500 nm (nanometer) or more. The multiple-reflection surface comprises a cross section in one direction with a collecting reflection surface and another cross section in a direction orthogonal to the one direction with multiple paraboloidal surfaces. A plurality of lamp units are arranged along a portion where the housing and the transparent cover are continuously superimposed.

In addition, in accordance with one or more embodiments of the present invention, a transparent cover is welded to a housing of a vehicle lamp by: superimposing the housing and the transparent cover; and collecting, by a multiple-reflection surface, a light of a light source on a portion where the housing is superimposed on the transparent cover. The light source applies incoherent electromagnetic waves that belong to a visible region or a near-infrared region in which a wavelength is 500 nm (nanometer) or more, and the multiple-reflection surface reflects and collects the light of the light source in a shape of a dot or a line.

Further, in accordance with one or more embodiments of the present invention, the multiple-reflection surface may formed with a cross section in one direction with a collecting reflection surface and another cross section in a direction orthogonal to the one direction with multiple paraboloidal surfaces.

Further, in accordance with one or more embodiments of the present invention, a plurality of lamp units may be arranged along a portion where the one part and the other part are continuously superimposed.

In accordance with one or more embodiments of the present invention, the incoherent electromagnetic waves that belong to the visible region and the near-infrared region in which a wavelength is 500 nm (nanometer) or more is collected, in the shape of a dot or line, on the portion where the housing is superimposed on the transparent cover, whereby welding is performed.

In accordance with one or more embodiments of the present invention, as the light source, the light source which applies the incoherent electromagnetic waves that belong to the visible region or the near-infrared region in which a wavelength is 500 nm (nanometer) or more, for example, is used. As a result, a cheap light source such as a halogen lamp can be used. Therefore, even in case that the plural lamp units are arranged along a welding line, the apparatus can be constructed at a low cost. Thus, since not the scan system but the flash system can be adopted, efficiency of the welding work can be improved. Accordingly, the vehicle lamp can be provided at a low cost.

In addition, in one or more embodiments of the present invention, the multiple-reflection surface is formed into a collecting reflection surface in section in one direction, and into multiple paraboloidal surfaces in section in a direction orthogonal to the above one direction. Therefore, by suitably arranging the multiple paraboloidal surfaces in the direction orthogonal to the above one direction, the light can be collected along a welding line composed of a curved line. Therefore, even if the welding line has the complicated shape, by only arranging a small number of lamp units, the whole of the welding line is covered.

In addition, in one or more embodiments of the present invention, a plurality of lamp units are arranged along the welding line, that is, along the continuous portion in which the housing and the transparent cover are superimposed. Therefore, by performing irradiation once, the welding work can be completed.

Other aspects and advantages of the invention will be apparent from the following description and the appended claims.

DESCRIPTION OF THE PREFERRED EMBODIMENTS

Embodiments of the invention will be described with reference to the accompanying drawings.

Figure 1:
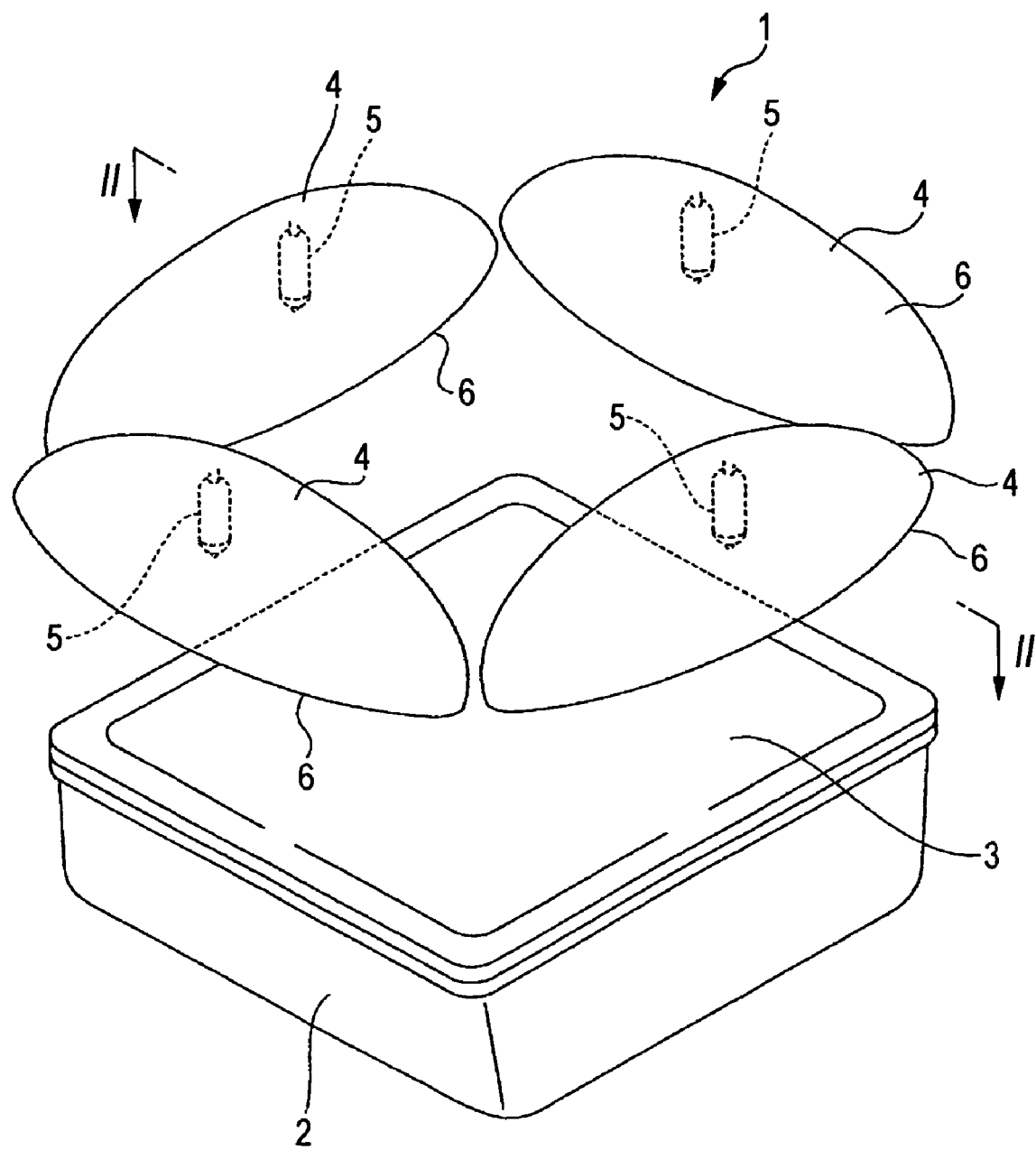
FIG. 1 is a perspective view showing an outline of a welding apparatus and a welding method.

FIG. 1 shows an outline of a welding apparatus 1 of an embodiment of the present invention. The welding apparatus 1 is used in order to weld a housing 2 having the nearly rectangular front shape and a transparent cover 3.

The welding apparatus 1 comprises a plurality of lamps 4, 4, ..., which are appropriately arranged. In the embodiment, four lamp units 4, 4, ... are arranged, and each lamp unit 4 performs welding on each one side of a welding line extending rectangularly.

The lamp unit 4 includes a light source 5 and a multiple-reflection surface 6. The light source 5 applies incoherent electromagnetic waves that belong to a visible region or a near-infrared region in which a wavelength is 500 nm or more. As the light source, for example, a halogen lamp can be used. Further, the multiple-reflection surface 6 reflects and collects the light from the light source in a shape of a desired dot or a line. Further, the light in the line shape is preferable from a viewpoint of work efficiency. In the embodiment, the multiple-reflection surface collects the light in the line shape.

Figure 2:
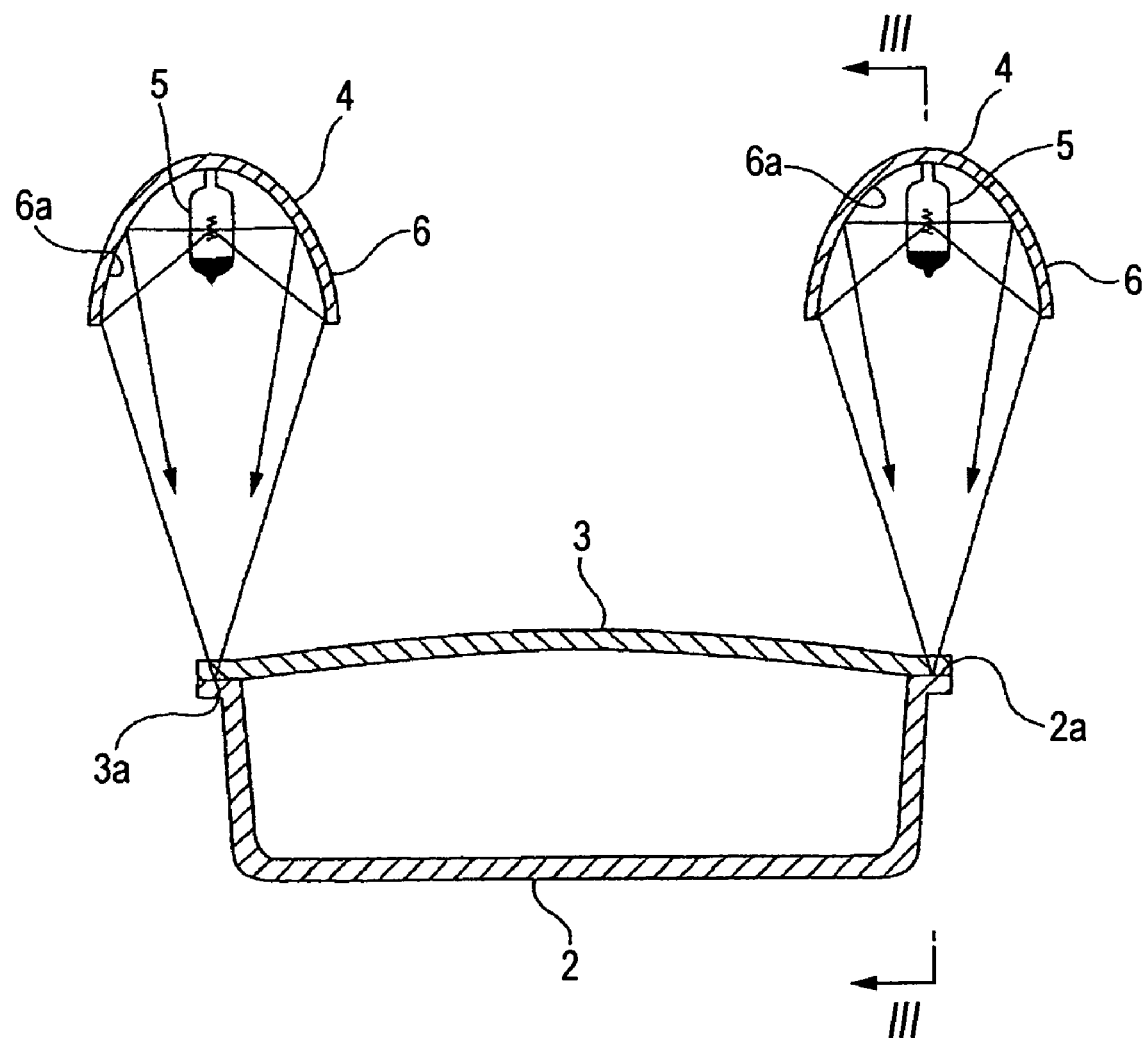
FIG. 2 is a sectional view taken along a line II-II of FIG. 1.

FIG. 2 is a schematically sectional view taken along a line II-II of FIG. 1. A direction along this line II-II corresponds to the one direction. In the multiple-reflection surface 6, a section 6a in the above one direction is formed into a collecting reflection surface, for example, an ellipsoidal reflection surface. A section 6b (refer to FIG. 3) in a direction orthogonal to the one direction is formed into multiple paraboloidal surfaces, wherein the reflection light becomes parallel light. Hereby, the light from the light source 5 is collected in the shape of a straight line. Further, the reflection light by the multiple paraboloidal surfaces 6b does not need to be the parallel light, and it is enough that the reflection light is applied along a welding surface 2a of the housing 2 with the constant irradiation amount.

Figure 4:
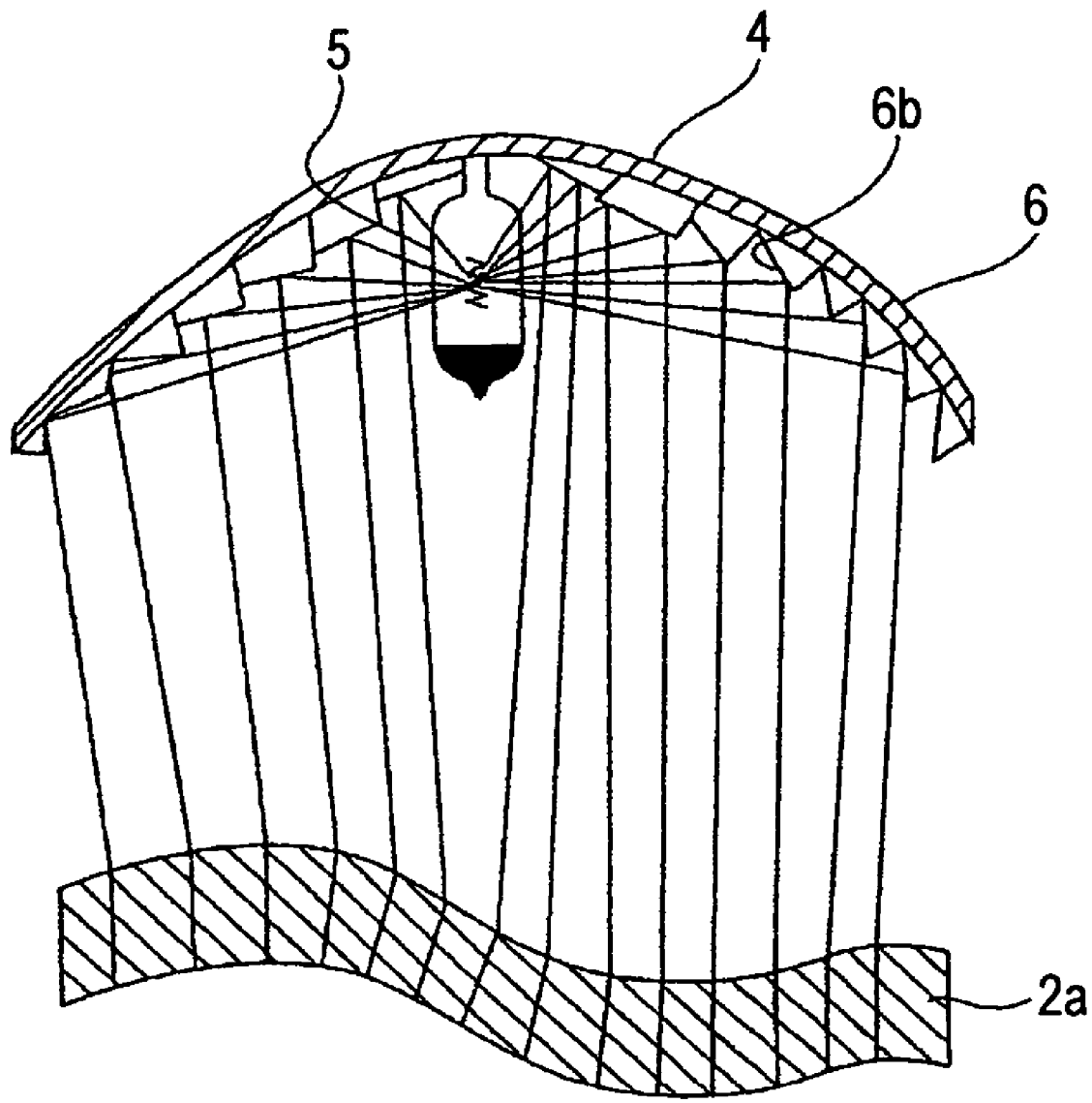
FIG. 4 is a schematically perspective view showing another example of a lamp unit.

In the embodiment, though the direction orthogonal to the one direction extends in the shape of a nearly straight line, it is not limited to the direction extending in the shape of the straight line but may be a direction extending curvedly as shown in FIG. 4. By making the direction orthogonal to the above one direction curved, the housing and the transparent cover which have the complicated outer shapes can be welded by a small number of lamp units.

Next, a method of welding the housing 2 and the transparent cover 3 by means of the welding apparatus 1 will be described.

First, the housing 2 and the transparent cover 3 are superimposed on each other.

Figure 3:
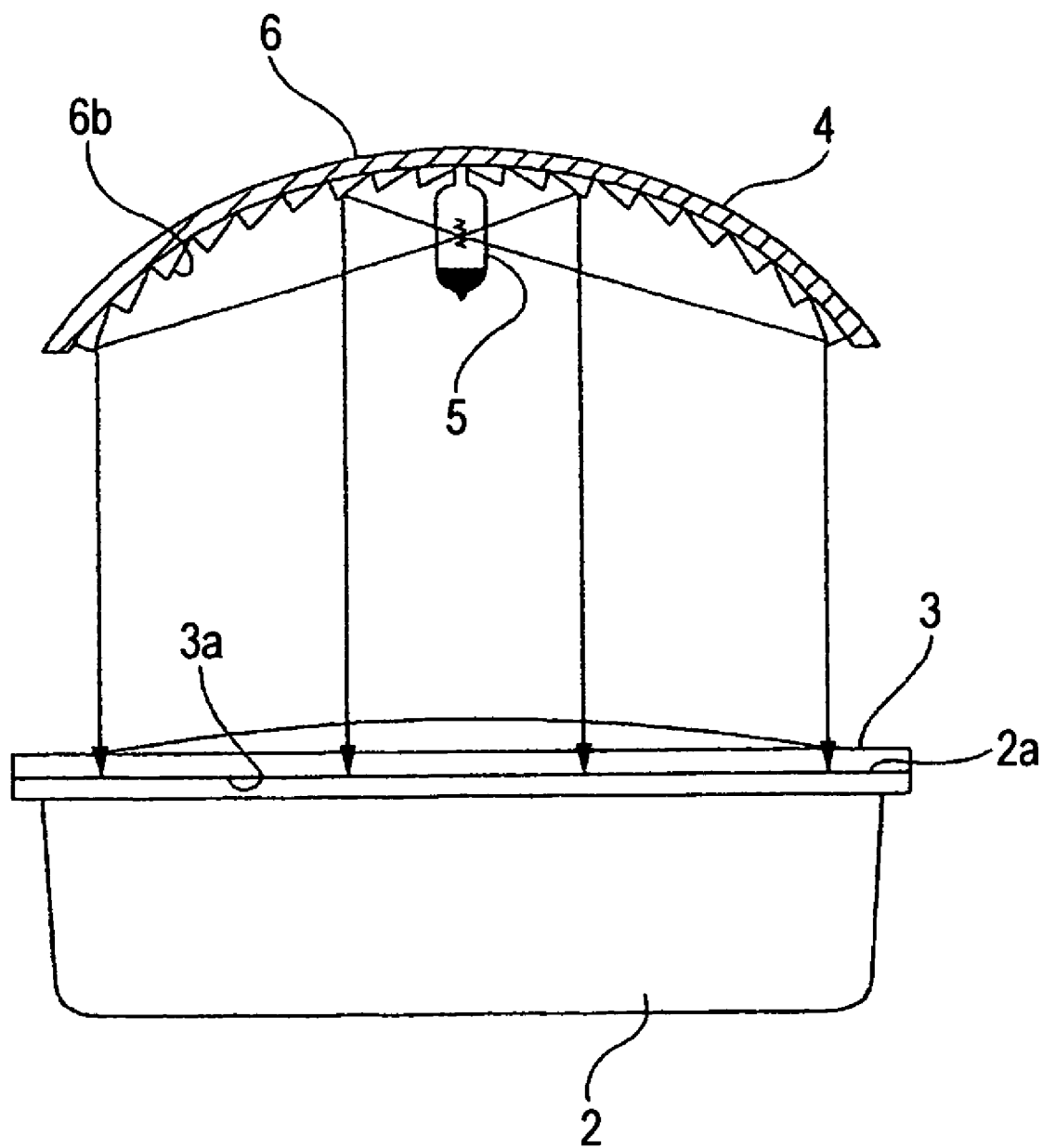
FIG. 3 is a sectional view taken along a line III-III of FIG. 2.

Next, by the lamp units 4, 4 . . . , incoherent electromagnetic waves that belong to a visible region and a near-infrared region in which a wavelength is 500 nm or more is irradiated on a superimposed surface of the housing 2 on the transparent cover 3, that is, the welding surface 2a (refer to FIGS. 2 and 3). As a material the housing 2, a resin with molecular structure composed of radical of which vibration frequency coincides with a wavelength of the applied electromagnetic wave is used, or an electromagnetic wave absorber that is easy to absorb the applied electromagnetic waves is applied onto the welding surface 2a. Therefore, when the electromagnetic waves is irradiated on the welding surface 2a of the housing 2 by the lamp units 4, 4 . . . , the welding surface 2a or the electromagnetic wave absorber applied thereon is excited and generates heat. Then, the generated heat is transmitted onto a welding surface 3a (surface coming into contact with the welding surface 2a of the housing 2) of the transparent cover 3, the both welding surfaces 2a and 3a are heated together, and they enter a compatibility state, so that the resin materials of the housing 2 and the transparent cover 3 are integrated on an interface where the two welding surfaces 2a and 3a come into contact with each other.

As described, the housing 2 and the transparent cover 3 are joined to each other on their welding surfaces 2a and 3a.

Since, in the welding apparatus 1 and the welding method using its apparatus, an expensive laser beam source is not used, the apparatus can be constructed at a low cost. Therefore, a plurality of lamp units can be arranged along the welding line, whereby welding between the housing and the transparent cover can be performed in a short time.

In the embodiments of the present invention, welding between the housing of the large-sized vehicle lamp and the transparent cover can be performed in a short time and at a low cost.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A welding apparatus for welding a first part to a second part, the welding apparatus comprising:
   a lamp unit including a light source and a multiple-reflection surface,
      wherein the light source applies incoherent electromagnetic waves, and the multiple-reflection surface reflects and collects light from the light source linearly,
      wherein the light of the light source is collected by the multiple-reflection surface on a portion where the first part is superimposed on the second part, and
      wherein the multiple-reflection surface comprises a collecting reflection surface in a cross section in a first plane, and multiple reflection surfaces making up a substantially parabolic reflection surface in a cross-section in a second plane orthogonal to the first plane.

2. The welding apparatus according to claim 1, wherein the first part is a transparent cover of a vehicle headlamp and the second part is a housing of the vehicle headlamp.

3. The welding apparatus according to claim 2, wherein the incoherent electromagnetic waves are in a visible region or a near-infrared region in which a wavelength is 500 nm or more, and a plurality of lamp units are arranged along a portion where the housing and the transparent cover are continuously superimposed.

4. The welding apparatus according to claim 1, wherein the incoherent electromagnetic waves are in a visible region or a near-infrared region in which a wavelength is 500 nm or more.

5. The welding apparatus according to claim 4, wherein the light source comprises a halogen lamp.

6. The welding apparatus according to claim 1, wherein the collecting reflection surface comprises an ellipsoidal reflection surface.

7. The welding apparatus according to claim 1, wherein a plurality of lamp units are arranged along a portion where the first part and the second part are continuously superimposed.

8. The welding apparatus according to claim 1, wherein the light reflected and collected by the multiple-reflection surface linearly extends in a straight line.

9. The welding apparatus according to claim 1, wherein the light reflected and collected by the multiple-reflection surface linearly extends in a curved line.

* * * * *